Dec. 10, 1946.    K. W. OLSON    2,412,471
AIR SPEED RESPONSIVE DEVICE
Filed July 2, 1943

Inventor
Kenneth W. Olson
by George H. Fisher
Atty.

Patented Dec. 10, 1946

2,412,471

UNITED STATES PATENT OFFICE 2,412,471

AIR-SPEED RESPONSIVE DEVICE

Kenneth W. Olson, Minneapolis, Minn., assignor to Minneapolis-Honeywell Regulator Company, Minneapolis, Minn., a corporation of Delaware Application July 2, 1943, Serial No. 493,316

6 Claims. (Cl. 73—204)

1

This invention relates to an air speed responsive device, particularly one which operates electrically.

One object of the invention is to provide a comparatively simple sensing element such as a grid of wire, which may be in the form of a coil and which is responsive to air speed, the sensing element adapted to perform a control function such as operating an electric gauge, graduated preferably in miles per hour, so that the device can be utilized on an airplane or the like for controlling or determining its speed.

A further object is to provide a bulb which is adapted to be mounted in an air stream and which is so constructed as to be responsive to the air passing thereover so as to vary the electrical resistance of the bulb in proportion to the speed of air passage.

More specifically, it is an object to provide a bulb which comprises a pair of coils that may be electrically energized and which are similarly subjected to temperature but differently subjected to the air stream, so that their electrical resistance is the same in response to ambient temperature changes, but varies in relation to each other in proportion to the speed of the air passing over the bulb, the coils being connected in a Wheatstone bridge circuit so as to give an indicating reading on a meter or the like connected therewith or perform a control function if desired.

Still another object is to provide a sensing element of this general character which may be compensated for altitude variations, as by means of a variable resistance in one arm of the bridge circuit, the resistance of which is varied in accordance with altitude, thereby at all times to give a direct air speed reading on the gauge, or perform a control function in direct proportion to actual air speed.

With these and other objects in view, my invention consists in the construction, arrangement and combination of the various parts of my sensing element whereby the objects contemplated are attained, as hereinafter more fully set forth, pointed out in my claims and illustrated in the accompanying drawing, wherein:

Figure 1:
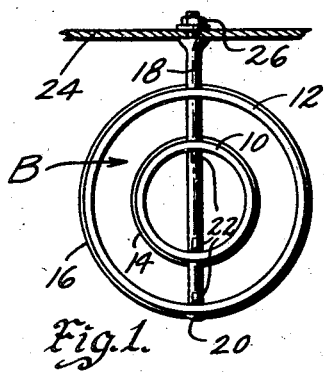
Figure 1 is a front elevation of the bulb which I have devised as a sensing element, it being shown, by way of illustration, as connected with an air speed indicator.

On the accompanying drawing, I have used the reference character B to indicate generally one kind of bulb I have devised for sensing air speed. The bulb may comprise a pair of tubular cores of insulating material indicated at 10 and 12, and air responsive elements such as coils 14 and 16 of resistance wire wound thereon. Suitable supports, such as a pair of rods 18 are provided for the cores 10 and 12 which may be retained on the rods 18 by means of heads 20 thereon and projections 22 on each rod. The rods in turn may be supported as on the covering 24 of an airplane wing, in an obvious manner, as by means of lock nuts 26 on the upper ends of the rods.

Figure 3:
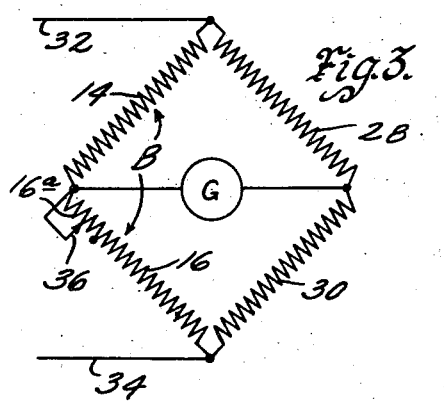
Figure 3 is an electrodiagrammatic view for the purpose of illustrating a Wheatstone bridge analysis of the circuit shown in Figure 2.

The elements 14 and 16 may be in the form of grids or the like, they being illustrated as coils on the drawing. They are substantially of the same ohmic resistance, so that they may be connected in a resistance bridge circuit such as one of the "Wheatstone" type. In such a circuit, as shown in Figure 3, they constitute the left hand branch of the bridge, whereas the right hand branch is constituted by two fixed resistances 28 and 30. Current supply or input for the bridge circuit is through a pair of wires 32 and 34. A gauge or meter G is connected between the upper and lower arms of the bridge, as shown in this figure.

I provide a potentiometer 16$^a$ for compensating against change of altitude, as will hereinafter appear. For this purpose, the movable arm 36 of the potentiometer is automatically actuated by an altitude responsive mechanism, such as a bellows 38 (see Figure 2). The potentiometer may be placed in any arm of the bridge circuit, it being in series with the coil 16 merely for purposes of illustration.

Figure 2:
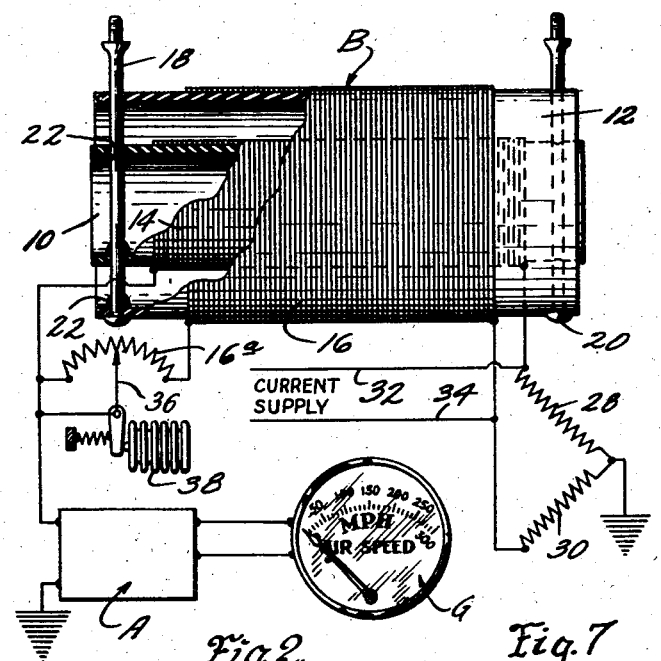
Figure 2 is a side elevation thereof, with portions broken away and other portions shown in section, the electric circuit of the bulb and the altitude compensating means being shown diagrammatically in this figure together with the air speed indicating instrument.

Figure 2 also illustrates an amplifier A between the bridge output and the gauge G. This gauge may be an ammeter type meter, and the amplifier may be of the usual electronic type for amplifying the slight controlling current from the bridge circuit and producing an output current of suitable amplitude for operating the gauge C with assured accuracy.

I have found that when a length of wire is energized with current and the wire is supported in an air stream such as that passing the wing of an airplane, its ohmic resistance varies in relation to the change in air speed. This holds true whether the wire is mounted on an airplane moving through the air or when stationarily mounted and the wind blows past it. The device can therefore be used to measure air speed in either instance.

Figure 5:
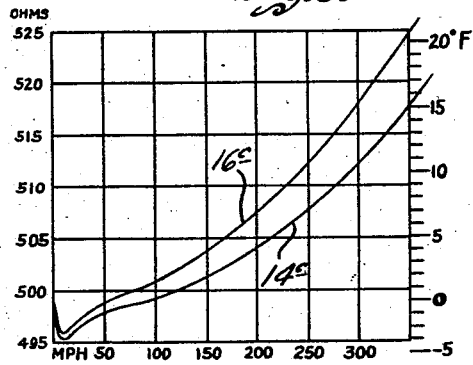
Figure 5 is a representative graph showing the change in resistance and temperature of the two coils of the bulb in proportion to air speed.

In Figure 5, I show a graph resulting from tests for the type of coils illustrated at 14 and 16 where they are wound to have a resistance in the neighborhood of 500 ohms. The curves for the respective coils are indicated as 14c and 16c. Considering for the moment only the coil 16 and its curve 16c, it will be noted that the ohmic resistance drops off as the air speed increases from zero to about 10 M. P. H. Ohmic resistance is indicated by horizontal lines on the graph and air speed in miles per hour by vertical lines, the respective indicia being at the left and the bottom of the graph. As the air speed increases above 10 M. P. H., the ohmic resistance increases. For instance, at 350 M. P. H. it will have increased to almost 525 ohms.

It is therefore evident that air speed could be determined by measuring the ohmic increase of a single coil and calculating the miles per hour from that. In the types of coils illustrated, the increase in ohmic resistance occurred above 10 M. P. H., but airplane speeds below those occurring upon take-off and landing are of no particular significance to the pilot. Other types of coils I have found to give a different resistance curve.

A single coil such as 16, however, would be subject also to ambient temperature, its ohmic resistance rising as its temperature increases due to ambient atmospheric temperature and/or heat from various sources, such as the sun, the airplane itself, and the engine of the airplane. To eliminate variation in response due to temperature changes, I therefore provide two coils, both of substantially the same resistance and both responding to the same ambient temperature. By then arranging the two coils so that the same air stream acts upon them differently, I am able to get the two curves 14c and 16c which differ from each other. The gauge G actually measures the ratio of ohmic resistance between the two coils and of course may be calibrated in miles per hour so as to give a direct air speed reading. Thus I am able, with two coils in a Wheatstone bridge circuit, to eliminate inaccuracies due to ambient temperature changes.

One way of making the two coils respond differently to the air stream is to wind them on two cores of different diameters, as shown in Figures 1 and 2, and then place one of them inside the other so that the outer one is subjected a greater extent to the air stream than the inner one. The ohmic resistance increase I have found to be greater for the outer coil than for the inner one if the coils are wound on cores of the same material.

Figure 4:
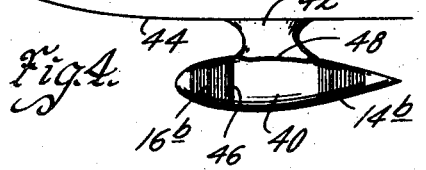
Figure 4 is an end view of an airplane wing with a sensing element or bulb of modified construction attached thereto.

Another way in which the two coils, such as indicated at 14b and 16b in Figure 4, can be subjected to different conditions with respect to the air stream, is to wind one of them on the forward portion of a streamlined body 40 and the other one on the rear portion thereof. Such a body may be supported as by a pylon 42 from an airplane wing 44. The wires to the coils may pass through the pylon. The body 40 may be made of metal, but if so, the forward and rearward portions thereof should be insulated from each other as by the insulation shown at 46, so that the temperature of one coil is not transmitted to the other one. Similarly, the body 40 should be insulated as at 48 from the airplane wing to prevent heat conduction thereto or therefrom.

An arrangement such as shown in Figure 4 gives different characteristic curves than the arrangement shown in Figure 2 and graphed in Figure 5, but the desired result of difference in ohmic resistance is had so that an air speed indication can be secured.

It is obvious that many arrangements of the two coils are possible to secure the prime result sought and other results desired, such as changes in the contour of the characteristic curves.

As to the factors which cause the ohmic resistance of the coils 14 and 16 to rise as air speed increases, they are due, in my opinion, to the resultant of frictional and impact heating forces, and radiation, conduction and convection cooling forces. With the types of coils at 14 and 16 and speeds up to 10 M. P. H., there seems to be a cooling effect due to radiation, conduction and convection, so that the ohmic resistance of the bulb drops. As the speed of the bulb with respect to the air increases above 10 M. P. H., however, friction and impact forces of the air on the bulb actually heat the wire of the coils above that caused by energization of the coils with a slight amount of current. The friction and impact heating forces then increase in proportion to air speed, as illustrated by the graph lines 14c and 16c, and the spread between the graph lines increases so as to give a reading on the gauge G. In a bulb that has two coils for temperature compensation, the temperature rise in certain bulbs may be in the order of 15–20° Fahr. between 50 and 350 M. P. H., as represented along the right hand side of the graph in Figure 5. The two coils are preferably mounted so that heat from one is not conducted to the other. The insulation material 10 and 12 serves this purpose.

Without compensation for altitude, an air speed responsive coil would not give a correct air speed reading. Therefore, some means such as the potentiometer 16a and the air density responsive device 38 may be used. The device 38, such as an air pressure responsive bellows, contracts with increase of altitude, thereby cutting in more of the potentiometer 16a to increase the effective resistance of the arm 16—16a of the bridge circuit. The two coils 14 and 16 are each preferably wound non-inductively and therefore usable on any alternating current circuit.

Figure 6:
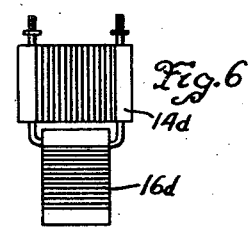
Fig. 6 is a reduced side elevation showing a different coil arrangement.

As to the arrangement of the two coils, I have shown one within the other in Figure 2 and a modified arrangement in Figure 4. Other arrangements, such as one coil 14d endwise to the air stream and the other coil 16d sidewise as shown in Fig. 6, gives a reading while compensating for ambient temperature variations, since such an arrangement subjects the two coils differently to the air stream. As to the material for the coils, a metal is used which is preferably free from impurities and does not corrode when subjected to atmosphere. Also, the resistance of the wire should not change with age or with atmospheric conditions. Nickel has been found to have these characteristics.

Figure 7:
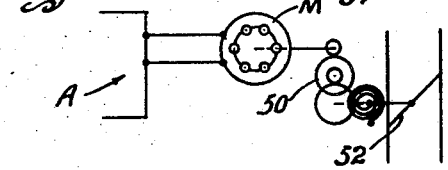
Fig. 7 is a diagrammatic view showing a control means in place of the indicating means of Fig. 2.

From the foregoing specification, it is obvious that I have provided an air speed sensing element which utilizes the change in electrical resistance of a stationary coil, thus eliminating mechanically movable elements as part of the pickup unit for an air speed indicator or control device. The sensing element is compensated for temperature changes by merely forming it as two arms of a Wheatstone bridge circuit. The output from the bridge circuit is operable for energizing either an indicator such as shown at G or a control device, such as an induction motor M (see Fig. 7) connected with a device to be controlled thereby. Such motor could be connected through suitable step-down gearing 50 with the throttle 52 of an airplane engine or any other part of the airplane to be controlled in accordance with air speed.

I am aware that prior devices have used a resistance element which is electrically heated to a temperature higher than that of the fluid, such as air flowing past the resistance element. The fluid carries away the heat of the resistance element in proportion to the speed of the fluid movement over the resistance element, thus causing a drop in its temperature and resistance. The basic difference of my device, when compared with the prior art devices, is in not making any attempt to regulate the temperature of the sensing or resistance element, but merely supplying an input current to the sensing element so that, normally, it will balance a Wheatstone bridge circuit to give a zero reading on the air speed gauge G. Advantage is then taken of the flow of air across the resistance element tending to heat it, rather than cool it, and obtain a reading due to the rise in heat and therefore ohmic resistance, the device thus being operable in the range of operating speeds of airplanes.

Some changes may be made in the construction and arrangement of the parts of my device without departing from the real spirit and purpose of my invention, and it is my intention to cover by my claims any modied forms of structure or use of mechanical equivalents which may be reasonably included within their scope without sacrificing any of the advantages thereof.

I claim as my invention:

1. In an air speed responsive device of the character disclosed, a pair of tubular sensing elements arranged one within the other so that they are differently subjected to flow of air at the same velocity over both elements, means for energizing said sensing elements, and means connected with said pair of sensing elements to respond to the ratio of ohmic resistance thereof as changed by the difference of impact and friction heating forces of the air on the respective elements.

2. In an air speed responsive device, a pair of tubular sensing elements similarly subjected to ambient temperature and one mounted within the other so that they are differently subjected to flow of air, means for energizing said sensing elements, control means connected with said sensing elements to respond to the ratio of ohmic resistance between them due to their difference in subjection to air flow, and means for modifying the position of said control means to compensate for changes in altitude.

3. An air speed responsive device comprising a pair of sensing elements, means for subjecting said sensing elements to an air stream whereby the relative resistance values thereof differ in response to air speed change, an altitude compensating element, a Wheatstone bridge circuit including a pair of fixed arms, one of said pair of sensing elements comprising one of the remaining arms of the bridge and the other of said pair of sensing elements comprising the other remaining arm of the bridge, said altitude compensating element being in one arm of the bridge, and air density responsive means for changing the resistance value of said altitude compensating element in response to altitude variation.

4. An air speed responsive device comprising an electrically energized coil of wire having a positive temperature coefficient, means for supporting said coil so that it is subjected to an air stream, means for energizing said coil, the degree of energization of said coil being so low that the temperature of the coil decreases with an increase in velocity of said air stream from zero to 10 miles per hour and when the velocity is in excess of 15 miles per hour the temperature of the coil rises due to impact and heating forces thereon resulting from air flow thereover and therefore its ohmic resistance rises as the air flow increases above said velocity of 15 miles per hour, and means responsive to said ohmic resistance for performing a control function.

5. An air speed sensing means comprising a pair of resistance wires, means for energizing said wires, means for supporting said wires so that they differ in their physical attitudes toward an air stream passing thereover with the impingement of free air on one and partially confined air on the other, means for measuring the ratio of ohmic resistance between said wires to thereby determine the speed of air past them, and variable resistance means responsive to air density change and connected in circuit with said measuring means for modifying the response of said measuring means to correct it for altitude changes.

6. An air speed responsive device comprising a pair of tubular sensing elements of wire having a positive temperature coefficient, one of said sensing elements being within the other whereby to present them differently to different sections of an air stream so that the relative resistance values thereof rise in response to an increase in air speed, a Wheatstone bridge circuit including a pair of fixed arms, one of said pair of sensing elements constituting one of the remaining arms thereof, and the other of said pair of said sensing elements constituting the other remaining arm thereof.

KENNETH W. OLSON.